INVENTOR
Norman F. Brown

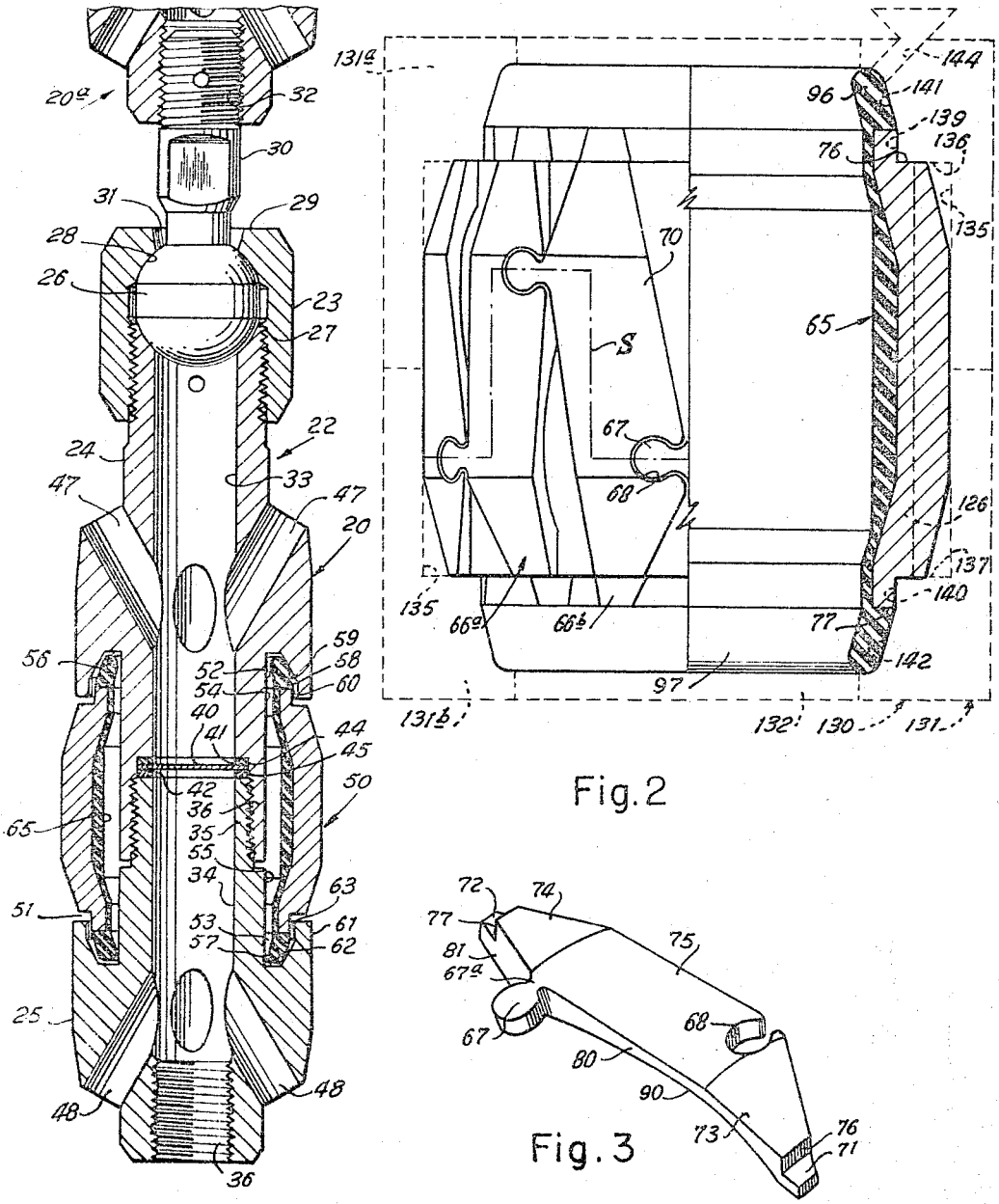

INVENTOR
Norman F. Brown
BY
ATTORNEYS

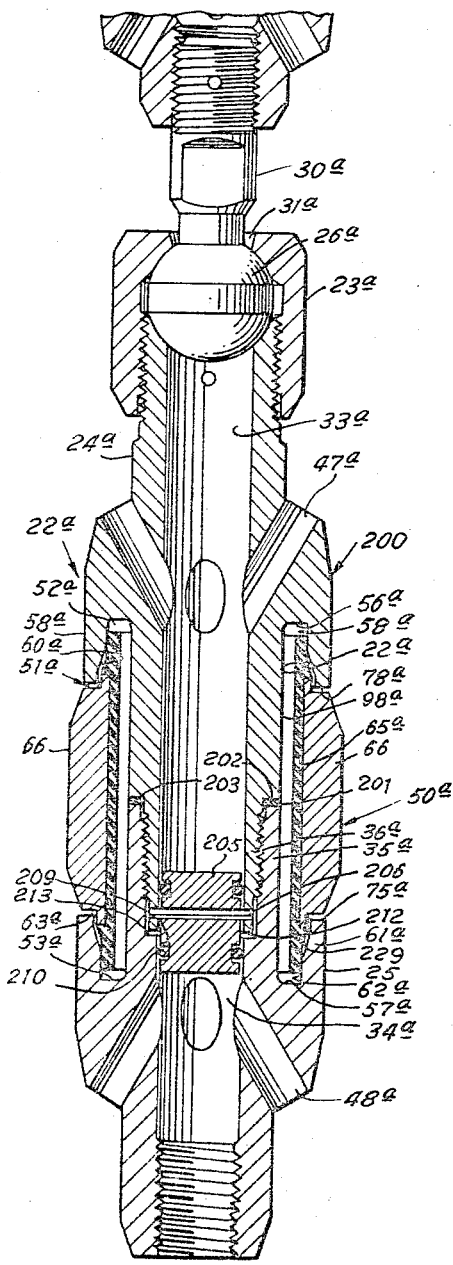
Fig. 15
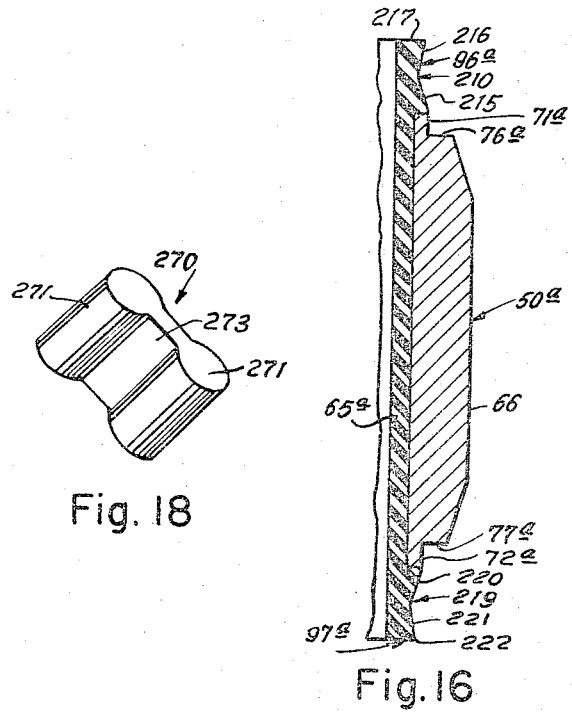
Fig. 18
Fig. 16
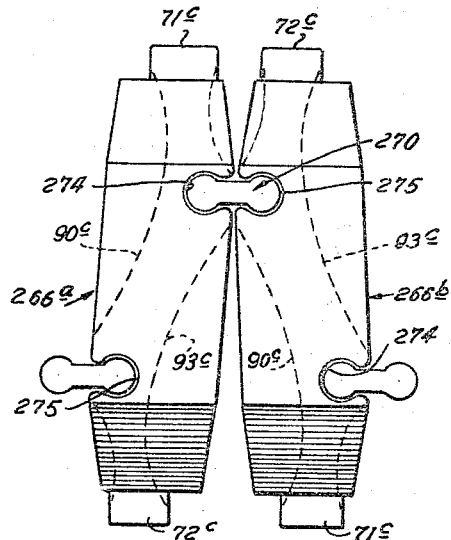
Fig. 17
INVENTOR
Norman F. Brown
BY
ATTORNEYS

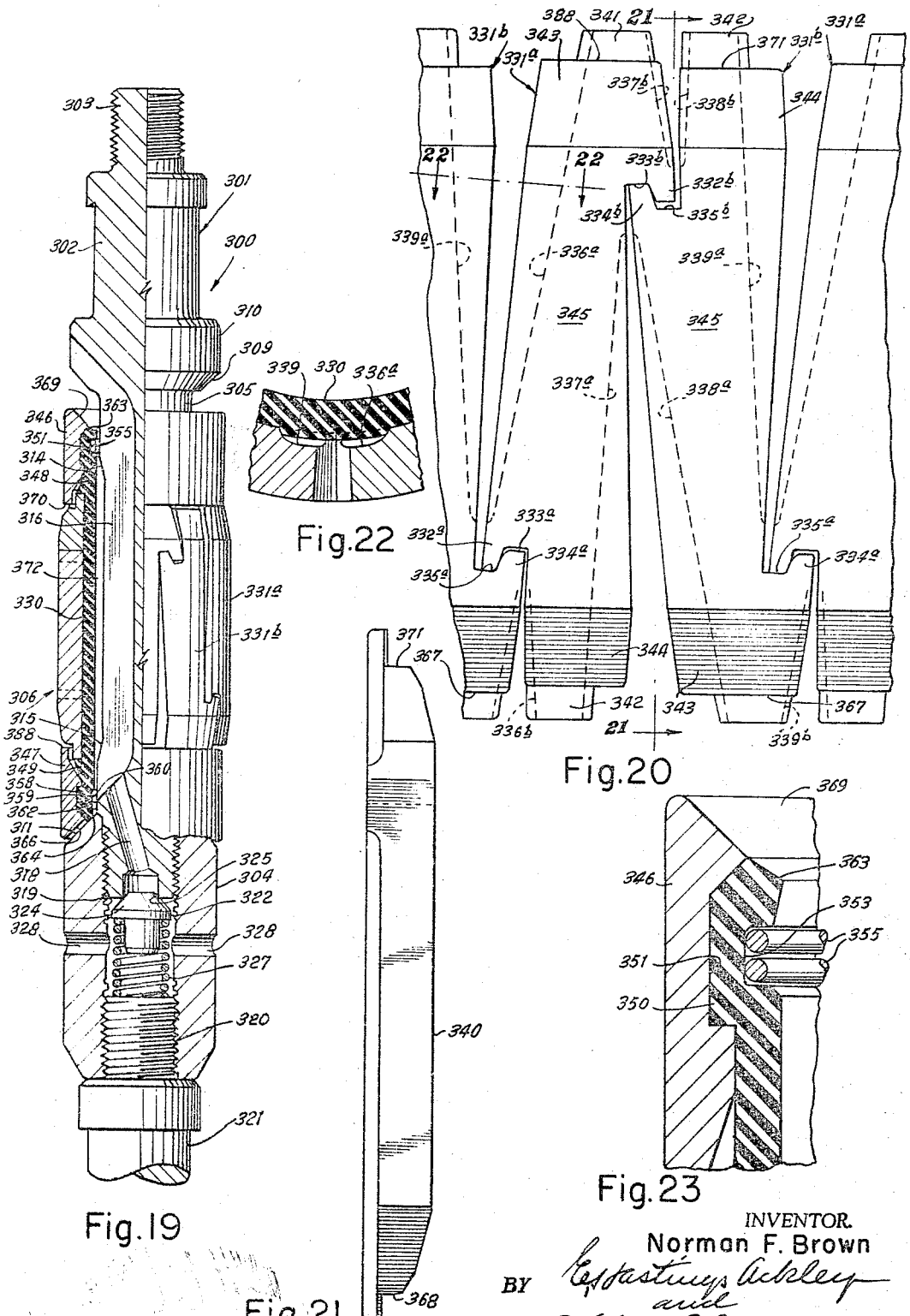

United States Patent Office 3,318,605
Patented May 9, 1967

3,318,605
DEVICE MOVABLE THROUGH A FLOW CONDUCTOR AND SEALS FOR USE THEREON
Norman F. Brown, Dallas, Tex., assignor to Otis Engineering Corporation, Dallas, Tex., a corporation of Delaware
Filed Oct. 9, 1964, Ser. No. 402,707
34 Claims. (Cl. 277—34)

This application is a continuation-in-part of co-pending application Ser. No. 312,175, filed Sept. 7, 1963.

This invention relates to seals and to devices employing seals.

An object of this invention is to provide a new and improved seal mountable on a first body movable in a passage of a second body for sealing between the two bodies.

Another object is to provide a device having a first body such as a cylinder or flow conductor provided with a chamber or a passage and a second body movable in the chamber or passage where the second body, such as a piston or a well tool, has a seal mounted thereon for sealing between the two bodies.

Another object is to provide a device of the type described wherein the seal is biased toward sealing engagement with both bodies by a pressure differential existing thereacross.

Still another object is to provide a device of the type described wherein the seal has a rigid wear resistant means for sealingly engaging the internal surface defining the passage.

Another object of the invention is to provide a new and improved well tool movable through a well flow conductor and having a seal on the body thereof for closing the annulus between the well tool body and the well flow conductor.

Still another object is to provide a new and improved well tool wherein the pressure differential across the seal holds the seal in sealing engagement with the well flow conductor and the well tool.

Another object is to provide a well tool wherein the well tool body and the seal have co-engageable means for sealing therebetween which are movable into sealing engagement by the pressure differential across the seal to prevent flow of fluid between the well tool and the seal regardless of the direction of the pressure differential existing across the seal.

A further object is to provide a well tool whose body has an external annular recess and longitudinally spaced inwardly facing annular grooves opening to the recess at opposite ends thereof and providing inwardly facing annular seal surfaces, and whose seal is disposed in the annular recess and has means projecting outwardly of the body through the recess for engaging the internal surfaces of a well flow conductor in which the well tool is positionable, the seal having annular resilient lips at opposite ends thereof disposed in the grooves and engageable with the seal surfaces.

A still further object is to provide a well tool wherein the seal is longitudinally movable in the body and which when in either extreme position on the body has one lip positioned for sealing engagement with its associated adjacent seal surface by the force exerted thereon by a pressure differential exerted across the seal while the other lip is positioned out of sealing engagement with its associated seal surface to permit communication of pressure from the exterior of the well tool into the external recess and between the body and the annular seal whereby the pressure differential across the seal biases the seal outwardly of the body and holds one lip in sealing engagement with its seal surface.

Another object of the invention is to provide a new and improved seal which has a great range of radial expansion and contraction and whose surfaces which sealingly engage the internal surfaces of a well flow conductor are provided by elements formed of a very durable wear resistant substance.

Still another object is to provide a seal formed of a plurality of circularly arranged segments of metal or the like embedded in an annular resilient body, each segment being hingedly connected to adjacent segments on each side thereof to permit pivotal movement of each segment relative to its adjacent segments about longitudinally and circumferentially spaced axes to provide for radial contraction and expansion of the annular seal.

Still another object is to provide an annular seal element wherein the resilient body of the seal has annular lips extending longitudinally outwardly of opposite ends of the metallic segments for engaging longitudinally spaced internal seal surfaces of a well tool body on which the seal element is mountable.

A further object is to provide a new and improved annular seal wherein each segment is pivotally connected to immediately adjacent segments at longitudinally spaced locations spaced from the middle plane of the seal which extends perpendicular to the central axis thereof and wherein adjacent segments are provided with inwardly and laterally opening recesses for accomodating or receiving portions of the resilient body deformed outwardly therebetween when the resilient body is compressed as the seal is moved towards its contracted position.

Another object is to provide a new and improved annular seal for use in a body or tool having an external recess and annular facing seal surfaces defining opposite ends of the recess, the annular seal being positionable in the recess and having a resilient tubular body whose opposite ends are engageable with the seal surfaces and which has a plurality of rigid segments embedded therein and articulately connected to one another to provide for radial contraction and expansion of the seal.

Still another object is to provide a seal of the type described having retainer rings at opposite ends thereof engageable with the rigid segments and the resilient tubular body for limiting radial outward movement of the segments and of opposite end portions of the tubular body.

Additional objects and advantages of the invention will be readily apparent from the reading of the following description of a device constructed in accordance with the invention, and reference to the accompanying drawings thereof, wherein:

FIGURE 1 is a vertical section view of a well tool embodying the invention connected in a string of well tools;

FIGURE 2 is an enlarged vertical, partly sectional view of the seal of the well tool illustrated in FIGURE 1;

FIGURE 3 is a perspective view of one of the segments of the seal;

FIGURE 15 is a vertical sectional view of a modified form of the well tool embodying the invention;

FIGURE 16 is a fragmentary vertical sectional view of the seal illustrated in FIGURE 15;

FIGURE 17 is a planar development view showing a modified form of segments pivotally connectable to one another by connector links;

FIGURE 18 is a perspective view of one of the connector links;

FIGURE 19 is a vertical partly sectional view of another modified form of a well tool having another modified form of the seal;

FIGURE 20 is a fragmentary planar development of the segments of the seal shown in FIGURE 19;

FIGURE 21 is a side vieew, taken on line 21—21 of FIGURE 20, of one of the segments of the seal;

FIGURE 22 is a fragmentary sectional view of the seal taken on line 22—22 of FIGURE 20; and, FIGURE 23 is an enlarged fragmentary sectional view showing the manner in which the outer end portions of the resilient seal body is secured to the retainer rings.

Figure 4:
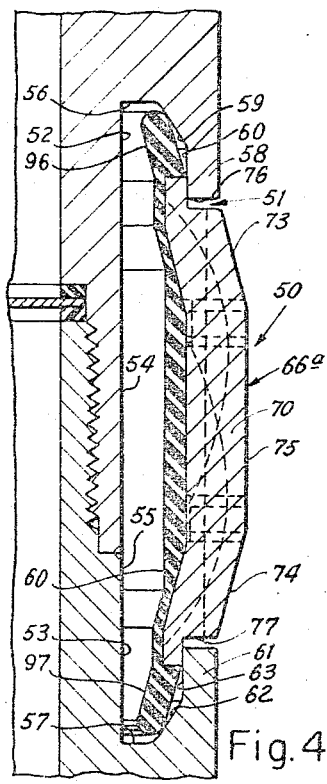
FIGURE 4 is a fragmentary enlarged partly sectional view of the well tool showing the seal in its fully expanded position relative to the body of the well tool prior to the insertion of the well tool into the flow passage of the flow conductor for longitudinal movement therethrough.
Figure 5:
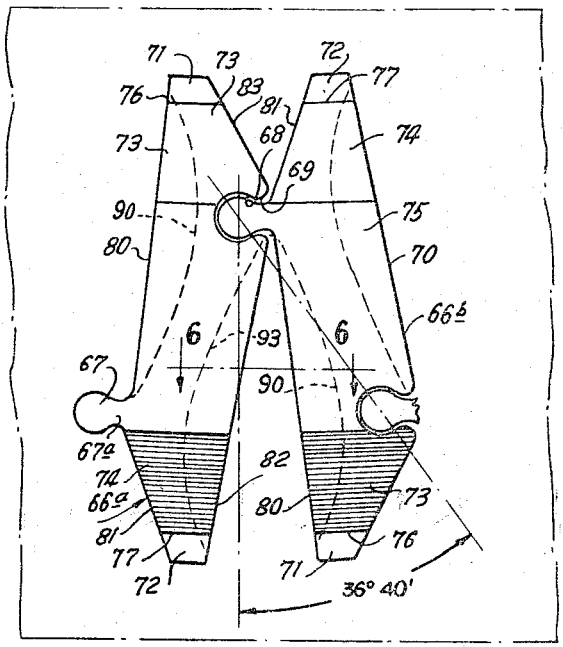
FIGURE 5 is a planar development view showing the position of a pair of the segments of the seal illustrated in FIGURE 4 when the seal is in its fully expanded position on the well tool body.

Referring now particularly to FIGURES 1 through 11 of the drawing, the well tool 20 there illustrated may be employed to move other well tools through a flow conductor by a pressure differential exerted thereacross, as by pumping fluid into one end of the flow conductor in which such well tool 20 and any tools connected thereto are disposed.

The well tool 20 includes a body 22 having a top swivel cap 23 and top and bottom seal retainer sections 24 and 25. A swivel ball 26 is movably positioned between the annular arcuate surface 27 at the upper end of the top retainer section and an opposed annular arcuate surface 28 of the internal annular flange 29 of the swivel cap.

The shank 30 of the swivel ball extends through the aperture 31 of the swivel cap defined by its internal annular flange and its upper end portion is threaded and receivable in a thread bore 32 in the lower end of any other well tool, such as another well tool 20a which is identical in structure to the well tool 20.

The top and bottom seal retainer sections are tubular in form and have longitudinal flow passages 33 and 34 extending therethrough. The reduced upper end portion 35 of the bottom retainer section is threaded in the lower end portion 36 of the top retainer section. The lower end of the flow passage 34 of the bottom retainer section is threaded, as at 32, to permit connection of a well tool to the lower end of the body.

A frangible closure disk 40 is positioned between the oppositely facing annular shoulders 41 and 42 of the top and bottom retainer sections and a pair of annular resilient seal rings 44 and 45 are interposed between the peripheral top and bottom surfaces of the frangible disk and the shoulders 41 and 42 respectively, to seal therebetween.

The closure disk prevents communication between the longitudinal passages of the retainer sections and therefore between lateral ports 47 and 48 of the top and bottom retainer sections respectively which communicate the longitudinal passages 33 and 34 with the exterior of the body above and below, respectively, the annular seal 50 carried by the body.

The annular seal 50 is disposed in an external annular recess 51 of the body and its upper and lower end portions are received in the top and bottom grooves 52 and 53 of the body which open downwardly and upwardly, respectively, into opposite annular ends of the external annular recess. The external recess and the top and bottom grooves are provided by the top and bottom retainer sections whose external vertical surfaces 54 and 55, respectively, define the inner vertical cylindrical side of the external recess and the outwardly facing vertical annular inner sides of the grooves and whose downwardly and upwardly facing annular surfaces 56 and 57 define the annular top and the bottom of the grooves 52 and 53, respectively. The outer side of the top groove which is formed by the annular downwardly extending flange 58 of the upper retainer section which has an internal outwardly and downwardly extending or beveled annular seal surface 59 which extends outwardly and downwardly from the outer end of the top surface 56 and an annular vertical inwardly facing stop surface 60. The outer side of the bottom groove is similarly defined by the upwardly extending annular flange 61 of the bottom retainer section which provides an upwardly and outwardly extending inwardly facing annular seal surface 62 and an annular vertical inwardly facing stop surface 63.

The annular seal 50 includes an annular resilient body 65 in which are embedded, and bonded thereto, the inner portions of a plurality of segments 66a and 66b of wear resistant substance, such as metal or the like. The identical segments 66a have configurations which are mirror images of the identical segments 66b. The segments of the seal are positioned in annular array or alignment with each segment 66a disposed between and pivotally connecting a pair of the segments 66b and with each segment 66b disposed between and pivotally connecting a pair of the segments 66a. Each adjacent complementary pair of segments 66a and 66b are pivotally connected by means of a lateral pin or pivot section 67 of circular configuration connected by a neck 67a to one longitudinal side of one of the segments of the pair disposed in a circular socket 68 of the other segment of the pair which opens through a slot 69 in a longitudinal side of the other segment facing the longitudinal side of the segment having the pin 67. The neck 67a, by which the circular pin 67 is secured to the longitudinal side of its segment in laterally or circumferentially spaced relation thereto, is smaller in width than the width of the slot 69 in which it is disposed so that each adjacent pair of segments connected by such pin and socket connections thereof are pivotally movable relative to each other through a limited range or distance about the axis of rotation of the pin in the socket. The axis of rotation of the pin and socket of a connected pair of segments 66a and 66b does not intersect the central axis of the seal but is parallel to a radial line perpendicular to the central axis of the seal.

The bosses 70 of the segments extend radially outwardly of the external surface of the body through the external recess of the body of the well tool to engage the internal surfaces of a flow conductor C through which the well tool is movable. Each segment has opposite end portions 71 and 72 positioned inwardly of the ends of the outwardly divergent beveled shoulders 73 and 74 of the bosses which extend in opposite longitudinal directions from the vertical arcuate outer seal surfaces 75 of the bosses. The end stop portions of the segments extend into the grooves of the body and their outer surfaces engage the annular stop surfaces 60 and 63 to limit outward movement of the segments relative to the body.

The longitudinal distance between the opposite horizontal end shoulders 76 and 77 of the bosses is smaller than the longitudinal distance between the annular downwardly and upwardly facing shoulders 78 and 79 of the flanges 58 and 61 of the top and bottom retainer sections, respectively, to permit limited longitudinal movement of the seal on the body.

The pin 67 and socket 68 of each segment are located at opposite sides of and spaced longitudinally or vertically from the central horizontal axis of the seal so that each segment is movable about two substantially horizontal radial axes which are spaced both circumferentially and longitudinally. Each segment has a long longitudinal side 80 and a short longitudinal side 81 which extend divergently in opposite longitudinal directions from opposite sides of its pin neck 67a and also has a long longitudinal side 82 and a short longitudinal side 83 which extend divergently longitudinally in opposite directions from opposite sides of the socket slot 69. It will be apparent that the long side 80 and the short side 83 of each segment extend longitudinally convergently in one direction to one end of the segment and the short side 81 and the long side 82 thereof extend longitudinally convergently in the opposite direction to the other end of the segment.

The resilient annular body 65 has circumferentially spaced outer portions 86 which extend radially outwardly into the interstices between adjacent sides of adjacent segments and longitudinally between the end shoulders 76 and 77 of the bosses thereof. The external surfaces 87 of such outer portions of the resilient body are spaced inwardly of the seal surface 75 and of the beveled shoulders 73 and 74 of the bosses so that no portion of the resilient body extends outwardly of the external recess 51.

Each segment has an internal arcuate recess 90 which extends longitudinally from adjacent its pin 67 to a point adjacent one end thereof and opens laterally outwardly at the side 80 thereof and which is defined by the arcuate surface 91 which curves outwardly and laterally from the inner surface 92 of the segment to the side 80 thereof. Each segment also has an arcuate recess 93 which extends longitudinally from adjacent its slot 69 to a point adjacent its upper end and which opens laterally outwardly at the long longitudinal side 82 thereof and is defined by the arcuate surface 94 which curves outwardly and laterally from the inner surface 92 to the side 82. The long sides 80 and 82 of each pair of adjacent segments 66 extend divergently in one longitudinal direction with their recesses 90 and 93 facing each other so that the arcuate recesses into which the outer portions 86 of the resilient body extend provide space for the substance of the resilient body to move outwardly as such segments pivot about their pin and socket connections to move their long sides 80 and 82 toward each other as the seal is contracted inwardly into the external recess 51 of the body. The short longitudinal sides 81 and 83 of adjacent pivotally connected segments which extend divergently in the opposite longitudinal direction simultaneously pivot or move away from each other about the axis of the pin 67, the resilient substance of the body therebetween stretching to permit such movement.

The resilient body 65 has top and bottom annular resilient lips 96 and 97 which extend longitudinally outwardly of opposite ends of the segments disposed in the top and bottom grooves 52 and 53, respectively, of the body. The lips are adapted to sealingly engage the seal surfaces 59 and 62 respectively. When the seal is in its lowermost position in the external recess with its downward movement on the body limited by the engagement of the shoulders 76 and 77 of the bosses 70 with the upwardly facing annular stop shoulder 79, the bottom lip 97 is in engagement with the seal surface 62 and the upwardly facing annular surface 57 and the top lip 96 is positioned below the annular downwardly facing surface 56 to permit flow of fluid into the upper end of the annular chamber or space 98 between the seal and the external surfaces 54 and 55 of the body.

When the seal 50 is in this lower position and the pressure in the flow conductor exteriorly of the body and above the seal is greater than the pressure exteriorly of the body below the seal, the fluid pressure from above the seal communicated to the upper end of the chamber 98 holds the bottom lip in sealing engagement with the surface 62 and biases the resilient body 65 and the segments 66 outwardly and into engagement with the internal surfaces of the flow conductor. Conversely, when the pressure in the flow conductor below the seal is greater than the pressure in the flow conductor thereabove, the seal is moved to its upper position on the body wherein the top stop shoulders 76 and 77 of the seal segments engage the downwardly facing annular shoulder 78 of the upper retainer section and the bottom lip is out of engagement with the upwardly facing annular surface 57 to facilitate communication of pressure from below the seal into the lower end of the chamber 98 which holds the top lip 96 in sealing engagement with the internal surfaces of the flow conductor.

In use, when it is desired to move a tool, such as a valve, plug or the like, through a well flow conductor by means of a fluid pumped into one end of the flow conductor, such tool is connected to the lower end of the body 22 of the well tool 20 by means of the lower threaded end portion of the longitudinal bore or passage of the lower retainer section. Another well tool 20a identical in structure to the well tool 20 is preferably connected to the upper end of the body of the well tool 20 by means of the shank of the swivel ball of the well tool 20 received in the threaded portion 32 of the bore of the bottom retainer section of the body of the well tool 20a. The seals of the two well tools 20 and 20a are longitudinally spaced to span any internal recesses of the flow conductor, such as the usual coupling or collar recesses thereof. If such coupling recesses are of considerably greater width and height than the outwardly projecting portions of the bosses, when the seal is in its fully expanded position and the bosses move outwardly into such recesses, the sealing engagement between the seal and the flow conductor would be lost and the pumped fluid could bypass the seal by flowing therepast through such coupling recess and the force of the pumping fluid would not be effective to move the well tool 20 further downwardly in the flow conductor. If two longitudinally spaced well tools 20 and 20a are employed, at least one is always in operative position closing the annulus.

The swivel connection between the two well tools 20 and 20a permits pivotal movement of one relative to the other during the movement of the well tools through curved, angled, or nonlinear portions of the flow conductor. The connection between the tool connected to the lower end of the well tool 20 may also include a swivel connection for this purpose.

The seal 50 of each well tool 20 and 20a, due to the resilient force of the annular resilient body thereof, assumes the fully expanded position illustrated in FIGURE 4 of the drawing wherein the bosses 70 thereof protrude outwardly of the body 22 and their outward movement is limited by the engagement of their shoulders 60 and 63 of the body toward which they are resiliently biased by the somewhat compressed resilient body so that the outer surfaces 75 of the bosses lie in a substantially cylindrical plane of greater diameter than the normal internal diameter of the flow conductor.

The assembly of the well tools 20 and 20a and the well tool connected to the lower end of the well tool 20 is then inserted into the flow conductor and fluid is pumped into the flow conductor at the surface of the well to move the assembly through the flow passage of the flow conductor C. As each of the well tools 20 is inserted into the flow conductor, its seal 50 is cammed inwardly toward a partly contracted or retracted position, FIGURE 7, the camming engagement of the downwardly facing beveled shoulders 74 and 73 of the segments 66a and 66b with the internal surfaces of the flow conductor facilitating such insertion of the well tools into the flow passage of the flow conductor and the movement of the seals past any obstructions of the flow conductor, such as the upwardly facing annular shoulder 101, FIGURE 8, at the upper end of the portion 102 thereof of decreased internal diameter. As the seal 50 is moved to such partly contracted or retracted position, the outer portion 86 of the resilient body between the facing sides 80 and 82 of adjacent segments may deform outwardly into the recesses 90 and 93 thus preventing undue compression and damage to the resilient body.

Figure 7:
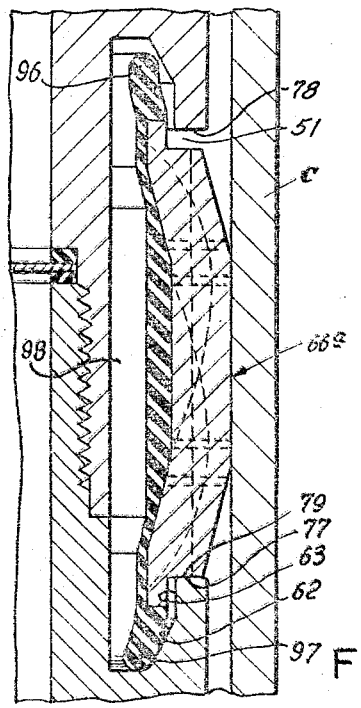
FIGURE 7 is a fragmentary vertical sectional view showing the well tool being moved downwardly through a portion of a well flow conductor of normal internal diameter and with a downwardly acting pressure differential exerted across the partially retracted seal.

When the seal 50 is in its normal operative position in a well flow conductor illustrated in FIGURE 7, the arcuate surfaces 75 of the bosses of the segments and the outer surfaces of the pin 67 and pin neck 67a thereof constitute sections of and lie in a cylindrical plane whose diameter is substantially equal to the normal internal diameter of the flow conductor and such surfaces sealingly engage the internal surfaces of the flow conductor along a substantially continuous line S, FIGURE 2, which extends circumferentially across the outer surfaces 75 of the bosses and the outer surfaces of the pin and pin neck of each segment. The only gaps in this line of sealing engagement may occur between the surfaces defining the sockets 68 and the adjacent and contacting outer surfaces of the pins disposed therein. Any such gaps, whose width is exaggerated in the drawings for clarity of illustration of the structure of the segments, are of extremely small orifice so that the seal effectively closes the annulus between the flow conductor and the body 22 on which it is mounted and any small leakage of fluid past the seal through such gaps does not decrease to any appreciable degree the efficiency of the well tool 20.

Figure 6:
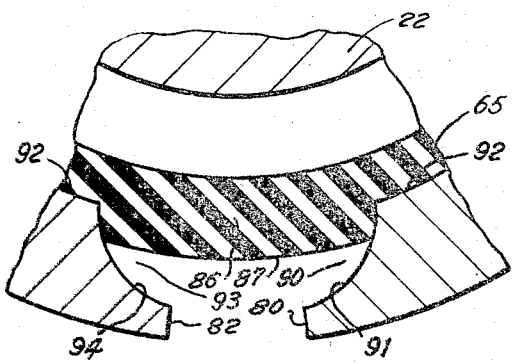
FIGURE 6 is a sectional view taken on line 6—6 of FIGURE 5.
Figure 8:
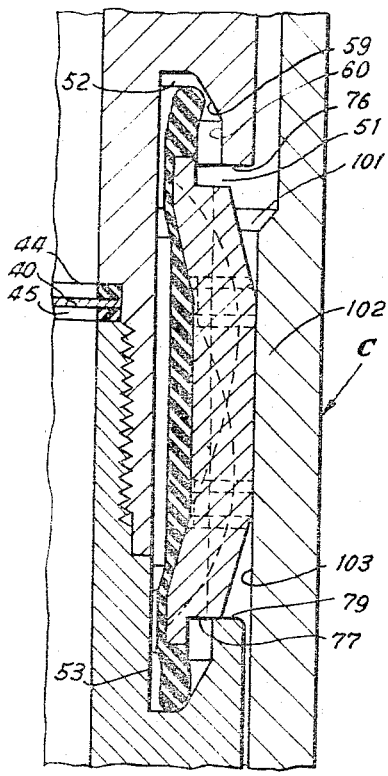
FIGURE 8 is a view similar to FIGURE 7 showing the seal passing through a portion of the well flow conductor of restricted internal diameter and with the seal in substantially fully retracted position.
Figure 9:
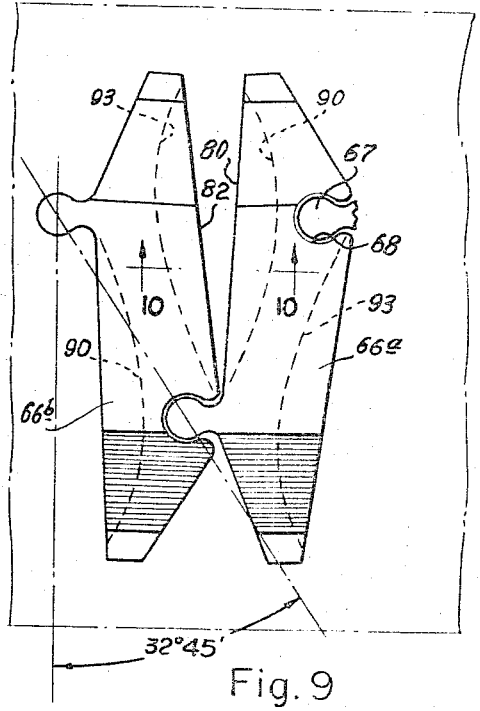
FIGURE 9 is a development view showing the relative positions of a pair of the segments of the seal when the seal is in the substantially fully retracted or contracted position illustrated in FIGURE 8.
Figures 10, 11:
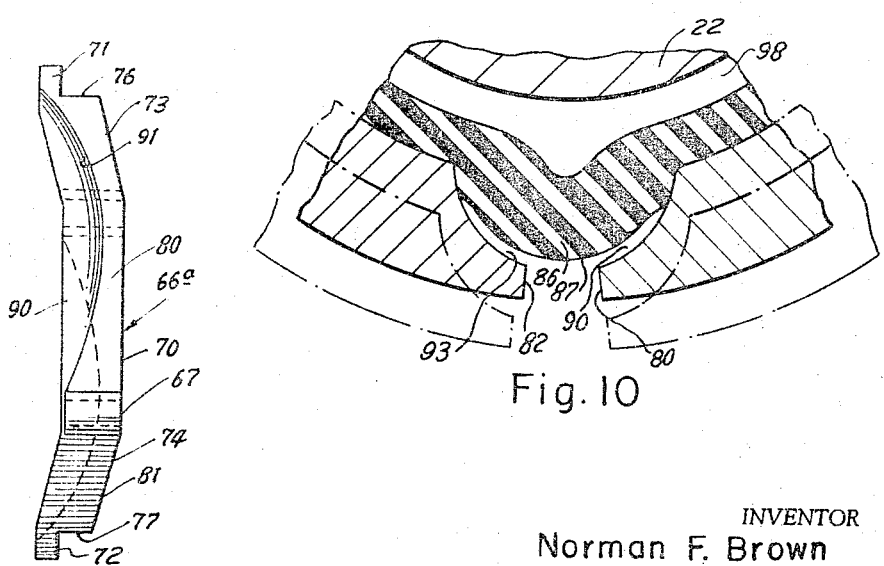
FIGURE 10 is a sectional view taken on line 10—10 of FIGURE 9.
FIGURE 11 is a side view of one of the metal segments of the seal.

When the seal is in its fully expanded position on the body, FIGURE 4, the angle between the axes of pivotal movement of adjacent segments above the axes of the pivotal connection thereof may be approximately 36°40′ and the outer portions 86 of the resilient body 65 which extend between the side surfaces of the segment and in the arcuate recesses 90 and 93 of adjacent segments are not deformed outwardly to any appreciable degree, FIGURE 6. It will be apparent that such angle may vary widely depending on the distance between the two axes of pivotal movement of the segments and the number of segments.

During the movement of the seal to its partly contracted or retracted position illustrated in FIGURE 7, each complementary pair of connected segments 66a and 66b pivots about its pin and socket connection in such direction that the adjacent facing side surfaces 80 and 82 of the two segments move toward each other and the adjacent facing side surfaces 81 and 83 thereof pivot away from each other. It will be apparent that each of the segments 66a rotates in a counter-clockwise direction, FIGURE 5, about the longitudinally and circumferentially spaced axes of its pivotal connections with the adjacent segments 66b between which it is positioned and that simultaneously each segment 66b pivots in a clockwise direction about the longitudinally and circumferentially spaced axes of its pivotal connections with the segments 66a between which it is positioned.

As the pressure in the flow passage of the flow conductor above the well tool 20 is increased, due to the pumping of fluid into the flow conductor, to a value which exceeds the pressure in the flow conductor below the well tool, its seal 50 is moved downwardly on the body until the lower shoulders 77 and 76 of the segments 66a and 66b, respectively, engage the upwardly facing shoulder 79 of the bottom retainer section. During such downward movement of the seal on the body, the top annular lip 96 of the annular resilient body 65 moves out of engagement with the downwardly facing annular shoulder 56 and the seal surface 59 of the top retainer section and the bottom lip 97 moves into engagement with the upwardly facing annular shoulder 57 and with the seal surface 62 of the bottom retainer section. The top lip is thus spaced from the seal surface and freed to flex inwardly to permit the fluid pressure in the flow conductor from above the seal to be communicated to the upper end of the annular chamber 98. Such fluid pressure acting on the internal surfaces of the resilient body biases the segments outwardly into engagement with the internal surfaces of the flow conductor and at the same time biases the bottom lip into sealing engagement with the seal surface 62 to close the lower end of the chamber 98 and prevent flow of fluid therefrom to the exterior of the well tool below the seal. The seal thus closes the annulus between the flow conductor and the body 22 on which the seal is mounted and the downwardly acting force of the pressure differential across the well tool 20, as fluid is pumped into the flow conductor, moves the well tools 20 and 20a and any other tool or tools connected thereto downwardly through the flow conductor. It will be apparent that the greater the pressure differential across the seal, the greater is the force with which the bottom lip is biased and held in sealing engagement with the seal surface 62 and the greater the force with which the segments are biased outwardly and held in engagement with the internal surfaces of the well flow conductor thus ensuring proper closure of the annulus between the well tool body and the well flow conductor regardless of the magnitude of the pressure differential which may be needed to move a particular assembly of tools through the flow conductor.

Since only the outer surfaces of the bosses and of the pins and pin necks of the segments, which are made of a hard wear resistance substance, such as a metal alloy, engage the internal surfaces of the well flow conductor, the well tool may be moved great distances through a flow conductor while maintaining proper sealing contact therewith without undue wear or damage to the seal.

When any such well tool 20 or 20a reaches an internal obstruction of the well tool which reduces the internal diameter thereof as, for example, the upwardly facing shoulder 101 of the portion 102 of the flow conductor, the camming engagement of the downwardly facing beveled shoulders 74 and 73 of the segments 66a and 66b, respectively, with such shoulder causes further radial contraction or retraction of the seal and further pivotal movement of the segments about their pin and socket connections.

Such contraction or retraction of the seal is facilitated, as explained above, by the space provided by the arcuate recesses 90 and 93 of adjacent complementary links 66a and 66b into which the substance of the resilient body and of its outer portions 86 may deform outwardly as it is compressed due to the radial contraction of the seal. Thus further inward or retracing movement of the segments decreases the effectiveness of the sealing engagement of the seal with the internal surface 103 of the portion 102 of the flow conductor since the surfaces of the boss, the pin 67 and the pin neck 67a of each segment is substantially equal to the radius of curvature of the internal surfaces of the well flow conductor at portions thereof of normal internal diameter and is therefore greater than the radius of curvature of the internal surfaces 103 of the portion 102. The increased leakage of the pumped fluid past the seal during the movement of the well tool through such reduced internal diameter of the flow conductor is quite small and is not of any appreciable import since the rate of introduction or pumping of the fluid into the flow conductor greatly exceeds any such increased rate of leakage of the fluid past the seal.

In dadition, since usually at least two well tools 20 and 20a are connected together and are spaced longitudinally any desired disance, it is very unlikely that both will at the same time be in such portion of restricted diameter so that at least one of such well tools will at all times provide an optimum seal with the flow conductor and closure of the annulus.

The assembly of the well tools may thus be moved downwardly by the introduction of fluid under pressure, as by pumping, into the flow conductor until the tool connected to the lower end of the body of the well tool 20 reaches a desired predetermined position in the well flow conductor. Such tool may have a locking means for locking it in position in a predetermined location, recess or nipple of the well flow conductor and have release means which permit the disconnection of the connecting component thereof connected to the lower end of the body of the well tool 20 so that the well tools 20 and 20a may be moved back upwardly in the flow conductor by an upwardly acting pressure differential leaving such tool locked in the flow conductor at the predetermined location or the whole assembly of tools including such tool connected to the body of the well tool 20 may be moved upwardly by such upwardly acting pressure differential. Such upwardly acting pressure differential, which exerts an upward force on the well tools 20 and 20a may be produced by any suitable means and in any suitable manner, as by the pressure of an earth formation in communication with the lower end of the flow passage of the flow conductor when the pressure in the flow conductor above the well tool is decreased below such earth formation pressure, as by reversing the direction of pumped fluid in two flow conductors connected near the bottom of the well. Such upwardly acting pressure differential moves the seals 50 of the well tools 20 and 20a upwardly on their bodies until the upwardly facing shoulders 76 and 77 of their segments 66a and 66b, respectively, engage the downwardly facing shoulders 78 of the well tool bodies. During such upward movement of each seal 50, the bottom lip 97 of its resilient annular body 65 is moved out of engagement with the upwardly facing annular shoulder 57 and the seal surface 60 of the bottom retainer section to permit the fluid pressure from below the seal to be communicated to the lower end of the annular chamber 98. The top lid 96 moves into engagement with the downwardly facing annular surface 56 and the seal surface 59 of the top retainer section so that the pressure from below the seal now holds the top lip in sealing engagement with the seal surface 60 thus closing the upper end of the annular chamber and biases the segments 66 radially outwardly and their outer surfaces into sealing engagement with the internal surfaces of the flow conductor.

The well tool 20 is then moved upwardly through the flow passage of the flow conductor, the upwardly facing beveled shoulders 73 and 74 of the segments 66a and 66b, respectively, facilitating movement of the seal past downwardly facing obstructions of the well flow conductor by camming the seal towards its contracted or retracted position by their camming engagement with such downwardly facing obstructions during upward movement of the tools through the flow conductor.

The frangible disk 40 is provided to permit equalization of pressures across the well tool 20 in the event that the bosses of the segments become lodged or locked in some internal recess or against some internal obstruction of the flow conductor while the seal still closes the annulus between the flow conductor and the body of the tool and the seal and, therefore, the well tool is held against movement from such locked position by the pressure differential existing across the seal and biasing the segments against inward movement. When such pressure differential exceeds a predetermined value which causes the force exerted thereby on the disk to exceed the force necessary to rupture the disk, the disk ruptures and permits fluid to flow through the longitudinal internal flow passages 33 and 34 and the ports 47 and 48 of the top and bottom retainer sections. Once the pressure differential across the well tool has thus been equalized, the well tool can be easily removed from the flow conductor as by a suitable fishing tool or the like lowered into the flow conductor by means of a flexible line, since the seal is no longer held against movement to its retracted position by a pressure differential thereacross.

In the event that the well tool installation is such that fluid can be pumped either into the lower end of the flow conductor or into the upper end thereof thus permitting flow of fluid and movement of well tools in either direction through the flow conductor, the rupturing of the frangible disk 40 re-establishes circulation through the flow conductor in order that a fishing tool may be pumped in the flow conductor to the lodged well tool to engage such well tool and so that the reverse circulation then established through the flow conductor may cause such fishing tool to remove such lodged well tool from the flow conductor.

It will now be seen that a new and improved well tool has been illustrated and described which includes a body having an external annular recess and vertically spaced annular recesses opening into opposite ends of the annular recess to provide internal annular seal surfaces on opposite sides of the external recess which are engageable by annular resilient seal means or lips of an annular seal positionable in the internal recess.

It will further be seen that the body is also provided with annular inwardly facing stop shoulders for engaging end stop portions of a seal disposed in the external recess and with vertically spaced downwardly and upwardly facing shoulders engageable with opposed stop shoulders of the seal for limiting longitudinal movement of the seal on the body.

It will also be seen that the annular seal includes a resilient annular body 65 and a plurality of pairs of complementary links or segments 66a and 66b connected together in a continuous circle and embedded in and bonded to the resilient body, the segments being movably interconnected to permit radial expansion and contraction of the seal.

It wil further be seen that each segment is pivotable relative to the segments connected thereto at opposite sides thereof about circumferentially spaced axes which are also spaced from the central plane of the seal which extends perpendicularly to the central longitudinal axis of the seal whereby portions of the segments of each adjacent pair of complementary segments extend in one longitudinal direction from the axes of pivotal connection thereof toward and past the central plane of the seal and move toward each other as the seal is radially contracted while the opposite end portions thereof extend in the opposite direction from such axis and move away from each other as the seal is radially contracted whereby the external diameter of the seal decreases.

It will further be seen that each pair of complementary segments have laterally opening recesses in adjacent sides thereof to receive portions of the resilient body deformed radially outwardly as such sides of the segments move toward each other as the seal is radially contracted.

It will further be seen that the segments have outer surfaces movable into sealing engagement with internal surfaces of a flow conductor to provide a continuous annular line of sealing engagement of the seal with such internal surfaces.

It will further be seen that although this continuous annular line of sealing engagement with the internal surfaces of the flow conductor becomes increasingly imperfect in proportion to the departure of the internal diameter of the flow conductor from the normal, the voids are extremely small and in practice are negligible or can be rendered so by using two longitudinal spaced tools provided with said seals.

It will be further seen that the seal has annular resilient lips on opposite ends thereof for sealing between the body of a well tool on which it is mounted and that the lips are held in sealing engagement with the body by fluid pressure acting in opposite longitudinal directions across the seal whereby the seal functions properly regardless of the direction of the pressure differential thereacross.

Figure 12:
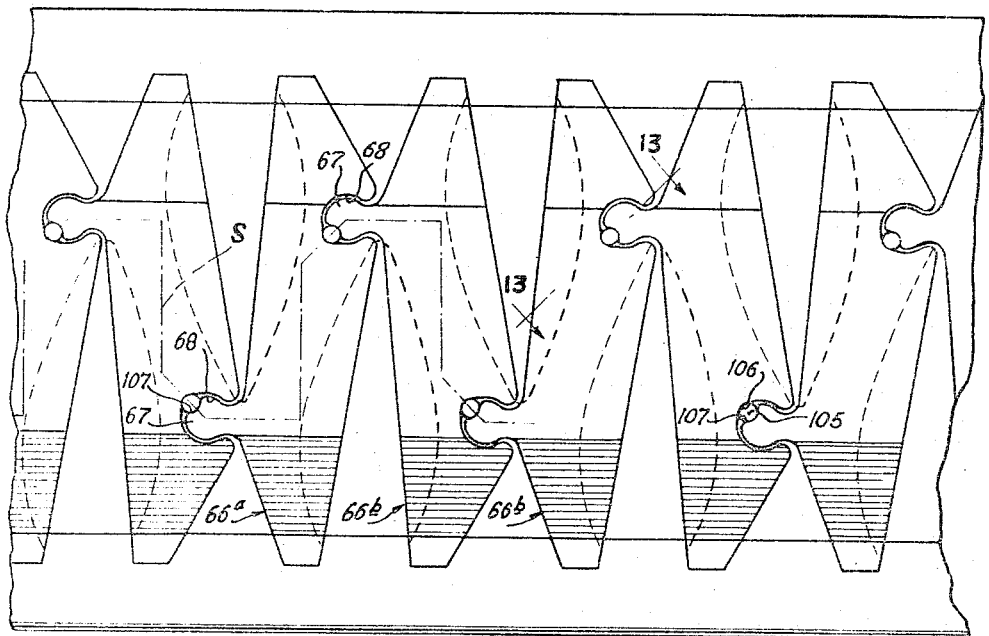
FIGURE 12 is a fragmentary planar development view of a modified form of the seal embodying the invention.
Figure 13:
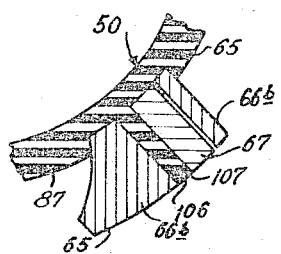
FIGURE 13 is a sectional view taken on line 13—13 of FIGURE 12.

Referring now to FIGURES 12 and 13 of the drawing, the seal there illustrated is similar in form and structure to the seal 50 illustrated in FIGURES 1 through 11 differing therefrom only in that the pin 67 of each segment thereof and the adjacent segment in whose socket 68 the pin is disposed are provided with complementary arcuate radial apertures or bores 105 and 106 in which is located a resilient plug 107 of susbtantially circular cross section integral with the resilient body 65 and extending radially outwardly therefrom. Each plug is molded and bonded to the adjacent surfaces of each pair of complementary segments and thus closes and seals any gap between the external surface of the pin 67 of one segment and the adjacent surfaces of the other complementary segment defining the socket 68 in which the pin 67 is disposed. The plugs yield resiliently to permit pivotal movement of the segments about the axes of their pin and socket connections. Since the plugs extend to the outer surfaces 75 of the bosses and of the pins, and since the line S of the sealing engagement interface extends across the outer surfaces of the plugs, they effectively prevent flow of fluid between the segments of each complementary and interconnected pair of segments when the seal is in sealing engagement with the internal surfaces of a flow conductor.

The seal 50 may also be used as a seal element of a swab. For example, the well tool 20 may be easily modified to function as a swab in flow conductor by replacing the frangible disk 40 with a seat ring, not shown, having an upwardly facing annular seat engageable by a ball valve disposed in the bore 33 of the top retainer section.

If such modified well tool is now lowered through a flow conductor, as by a flexible line, no appreciable pressure differential exists across the seal thereof during such downward movement since the ball valve is moved upwardly in the passage 33 of the top retainer section off the seat of the seat ring into a position above the inner ends of the lateral ports 47 permitting communication or flow of fluid past the seal through the lateral ports 48, the passage 34 the seat ring, the passage 33 and the ports 47. The seal 50 thus is not forced toward expanded position by pressure differential and such modified well tool 20 easily moves downwardly through the flow conductor. When upward movement is then imparted to such modified well tool, the column of liquid in the flow conductor trapped above such well tool causes a downwardly acting pressure differential to be created across the seal 50 since the ball valve moves downwardly into sealing engagement with the seat of the seat ring and prevents flow of fluids downwardly through the ports 47, the passages 33 and 34, and the ports 48. The seal 50 is biased by such pressure differential toward expanded position closing the annulus between the flow conductor and the body of the well tool causing such trapped column of liquid to be moved upwardly in the flow conductor as the well tool is moved upwardly therein.

When the seal 50 is to be used as an element of a swab, the lip 96 may be omitted since the seal need seal only if the force of the pressure differential acts in one longitudinal direction thereacross.

The thus modified well tool may be employed as a paraffin scraper since the seal 50 will contract as the well tool is moved downwardly upon engaging any deposits of paraffin on the internal surfaces of the well flow conductor since no pressure differential exists thereacross during its downward movement and is expanded and biased outwardly by the pressure differential thereacross as the well tool is moved upwardly into sealing engagement with the internal surfaces of the flow conductor and will thus engage and scrape such paraffin deposits off the internal surfaces of the flow conductor during its upward movement in the flow conductor.

It will also be seen that while the seal 50 has been described as mounted on the body of a well tool which is movable through a flow passage of a flow conductor, the seal 50 may be mounted in external recesses of pistons movable in the chambers or passages of housings or cylinders of pumps, hydraulic rams and the like to seal between the pistons and such housings or cylinders.

Figure 14:
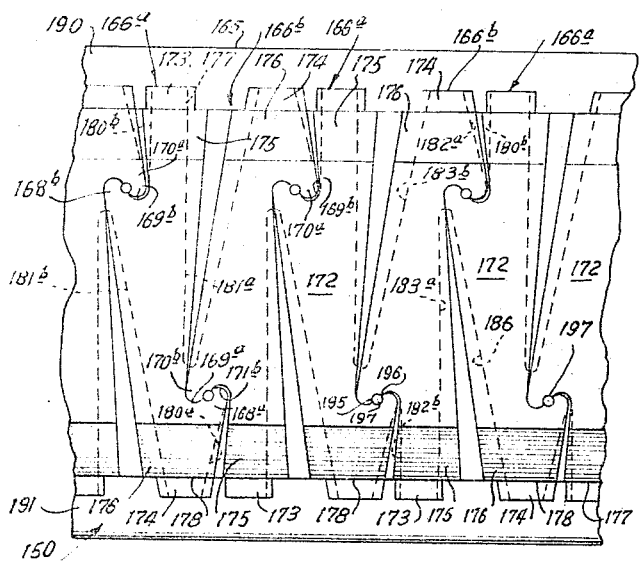
FIGURE 14 is a fragmentary planar development of another modified form of the seal embodying the invention.

Referring now to FIGURE 14 of the drawing, the seal 150 which is similar to the seal 50 in structure and function includes an annular resilient body 165 in which are embedded and bonded thereto the inner portions of a plurality of segments 166a and 166b of wear resistant substance, such as metal or the like. The identical segments 166a have configurations which are mirror images of the identical segments 166b. The segments of the seal are positioned in an annular array or alignment with each segment 166a disposed between and pivotally connecting a pair of the segments 166b and with each segment 166b disposed between and pivotally connecting a pair of the segments 166a.

Each segment 166a has a pair of pivot pins or hooks 168a and 168b which extend divergently from opposite sides of the segment in the same longitudinal direction and with the side surfaces of the segment define the sockets 169a and 169b, respectively. Each segment 166b similarly has pivot pins or hooks 170a and 170b which extend divergently from opposite sides of the segment and which define the sockets 171a and 171b, respectively. The hook 168a of each segment 166a extends into the socket 171b of one adjacent segment 166b and its hook 168b extends into the socket 171a of its other adjacent segment 166b. Conversely, of course, the hooks 170a and 170b of each segment 166b extend into the sockets 169b and 169a, respectively, of adjacent segments 166a. The hooks of each segment are of somewhat smaller lateral dimensions than the widths of the sockets in which they are received so that the segments are pivotally movable relative to each other through a limited range. The axis of pivotal movement of a connected pair of segments does not intersect the central axis of the seal but is parallel to a radial line perpendicular to the central axis of the seal. The bosses 172 of the segments extend radially outwardly of the external surface of the resilient body 165. Each segment has opposite end portions 173 and 174 positioned inwardly of the ends of the outwardly divergent beveled shoulders 175 and 176 of the bosses which extend in opposite longitudinal directions from the arcuate outer seal surfaces of the bosses. The end stop portions are receivable in the grooves 52 and 53 of the body 22 to limit outer movement of the segments relative to the body. The longitudinal distance between the opposite horizontal end shoulders 177 and 178 of the bosses is of course shorter than the longitudinal distance between the annular downwardly and upwardly facing shoulders 78 and 79 of the flanges 59 and 61 of the top and bottom retainer sections, respectively, of the body to permit limited longitudinal movement of the seal on the body. Each segment 166a has internal arcuate recesses 180a and 181a which open to one side of the segment and with similar recesses 180b and 181b which open to the other side thereof. Similarly each segment 166b has internal arcuate recesses 182a and 183a which open laterally to one side thereof and internal recesses 182b and 183b which open to the other side thereof.

The recesses 180a and 181a of each segment face the recesses 182b and 183b of one adjacent segment 166b and its recesses 180b and 181b face the recesses 182a and 183a of the other adjacent segment 166b to provide room for the portions of the resilient body which extend radially outward between adjacent sides of adjacent segments on opposite ends of the hook connections of the segments to move outwardly as the segments move pivotally relative to each other. The resilient body 165 has top and bottom annular resilient lips 190 and 191 which extend longitudinally outwardly of opposite ends of the segments disposed and which are receivable in the top and bottom grooves, respectively, of the body 22.

It will be apparent that the seal 150 is positionable on the body 22 of the tool in the same manner as the seal 50 and will function in the same manner. The hook and socket pivotal connection of the segments 166a and 166b is of greater strength than the pin and socket connection of the segments 66a and 66b of the seal 50 since the necks 67a of the pins 67 are rather narrow and may break when subjected to great stresses. It will be apparent that the co-engageable hooks of the segments 166a and 166b have a greater strength and are not as likely to shear or break when subjected to longitudinal as well as lateral stresses.

If desired, adjacent surfaces of the hooks 168a and 170b and of the hooks 168b and 170a may be provided with complementary arcuate radial apertures or bores 195 and 196 in which are located resilient plugs 197 of substantially circular cross section integral with the resilient body 165 and extending radially outwardly therefrom. Each plug is molded and bonded to the adjacent surfaces of each pair of complementary hooks and thus closes and seals any gap therebetween. The plugs yield resiliently to permit movement of the hooks relatively to one another since the plugs extend to the outer seal surfaces of the bosses and since line S of sealing engagement of the seal surfaces with the internal surface of a flow conductor extends across the outer surfaces of the plugs, they effectively prevent flow of fluid between the segments of each pair complementary and interconnected segments when the seal is in sealing engagement with the internal surfaces of a flow conductor.

The modified form of the well tool 200 illustrated in FIGURES 15 and 16 of the drawing is substantially similar in structure and mode of operation to the well tool 20 and, accordingly, elements of the well tool 200 have been provided with the same reference numerals, to which the subscript "a" has been added, as the corresponding elements of the well tool 20. The top and body seal retainer sections 24a and 25a of the well tool 200 are threadedly connected together, the reduced lower end portion 36a of the top retainer section being threaded in the lower end portion 35a of the top retainer section 24a. A suitable toothed lock washer 201 is disposed between the shoulders 202 and 203 of the retainer sections to hold the two retainer sections against accidental rotatable movement relative to one another which could result in the unscrewing of one section from the other.

A plug 205 is positioned in the longitudinal flow passage of the body 22a and is releasably secured to the top retainer section by a shear pin 206 which extends through suitable aligned apertures in the plug and in the top retainer section. A pair of longitudinally spaced O-rings 209 and 210 disposed in suitable external annular recesses of the plug seal between the plug and the top and bottom retainer sections thus preventing flow of fluid between the two sections. The O-ring 209 sealingly engages the internal surface of the top retainer section below the lower ends of the lateral ports 47a and above the annular downwardly facing shoulder 212 thereof while the O-ring 210 sealingly engages the internal surface of the bottom retainer section above the upper ends of the lateral ports 48a and below the annular end shoulder 213 thereof. The O-rings therefore prevent any flow of fluid into or out of the annular chamber 98a through the threaded connection between the top and bottom retainer sections.

It will be apparent that if the well tool becomes lodged in a well flow conductor, an increase in the fluid pressure in such well flow conductor at one end of the flow conductor which increases the pressure differential across the plug 205 above a predetermined value will cause the shear pin 206 to shear. For example, if the pressure is increased in the flow passage 33a, the plug is moved longitudinally in the passage 34a of the bottom retainer section until its O-ring 209 moves past the inner ends of the lateral ports 48a of the bottom retainer section. Conversely, if the fluid pressure is increased at the other end of the well tool, the plug is moved in the opposite direction in the longitudinal flow passage 33a of the top retainer section 24a until the O-ring 210 moves past the inner ends of the lateral ports 47a. It will thus be seen that the plug 205 has the same function as the frangible disk 40 of the well tool to permit fluid flow through the body 22a when the pressure differential across the plug exceeds a predetermined value.

The annular seal 50a is substantially similar to the annular seal 50, but the annular end lips 96a and 97a of the seal 50a are of different configurations from the corresponding end lips of the seal 50. Seal lip 96a has an external annular recess 210 defined by an annular surface 215 which extends inwardly and upwardly from the ends of the segments and an annular surface 216 which extends upwardly and outwardly to the upper end of the lip and forms an interference edge 217 thereat. The end lip 97a similarly has an annular external recess 219 defined by an annular surface 220 which extends downwardly and inwardly from the ends of the segments and an annular surface 221 which extends outwardly and downwardly to the bottom end of the lip and forms an interference edge 222 thereat.

The seal lips 96a and 97a thus have annular portions of decreased thickness spaced from the ends thereof which ensure that any longitudinal fluting or folding of the resilient body 65a at the portions of the lips located longitudinally outwardly of the ends of the segments caused by the compression of the resilient body 56a will terminate in such annular areas of decreased thickness and will not extend to the end edges of the lips and thus interfere with sealing efficacy of the lips.

The spaced grooves 52a and 53a of the top and bottom retainer section of the well tool 200 which open to the annular external recess 51a of the body 22a are of somewhat different configuration from the corresponding grooves of the body 22 of the well tool 20. The internal outer side of the top groove 52a which is provided by the annular downwardly extending flange 58a includes an internal cylindrical seal surface 59a which extends from the downwardly facing annular surface 56a defining the upper end of the groove, the downwardly and outwardly beveled annular intermediate surface 228 and an annular cylindrical stop surface 60a which is engageable by the stop portions 71a and 72a of the segments of the seal which project upwardly into the top groove 52a. The internal outer side of the bottom groove 53a which is similarly provided by the annular upwardly extending annular flange 61a of the bottom retainer section includes the cylindrical annular seal surface 62a which extends from the annular upwardly facing surface 57a which defines the bottom end of the groove, an upwardly and outwardly beveled intermediate surface 229 and a cylindrical stop surface 63a which is engageable by the stop portions 71a and 72a of the segments of the seal which extend downwardly into the bottom groove.

The inherent configuration of the seal lips 96a and 97a, shown in FIGURE 16, is such that when the seal is positioned on the body, the interference edges 217 and 222 and outer portions of the surfaces 216 and 221 engage the seal surfaces 59a and 62a, respectively, and are deformed resiliently inwardly as shown in FIGURE 15. Each end lip 96a and 97a thus prevents flow of fluid from the annular chamber 98a therepast to the exterior of the body but flexes inwardly to permit the flow of fluid from the exterior of the body therepast into the annular chamber 98a.

Longitudinal movement of the seal 50a on the body is limited by the engagement of the opposite horizontal end shoulder 76a and 77a of the bosses of the segments 66a with the shoulders 78a and 79a of the flanges 51a and 61a. The range of longitudinal movement of the seal prevents engagement of the end lips with the shoulders 56a and 57a of the top and bottom grooves.

It will now be apparent that the well tool 200 functions in the same manner as the well tool 20 to close the flow passage of a flow conductor through which it may be movable by a fluid pressure differential existing thereacross. The end lip 96a is held in sealing engagement with the seal surface 58a to close the upper end of the chamber 98a, when the seal 50a is moved to its uppermost position on the body by an upwardly acting pressure differential existing thereacross, by the fluid pressure which is admitted to the lower end of the chamber by the inward flexing of the end lip 97a. Conversely, the end lip 97a is held in sealing engagement with the seal surface 62a when the seal 50a is moved to its lowermost position on the body by a downwardly acting pressure differential existing thereacross, by the fluid pressure which is admitted to the end of the upper chamber by the inward flexing of the end lip 96a.

The segments of the seals 50 and 50a may have the form and be movably interconnected as shown in FIGURES 17 and 18. The segments 266 are substantially similar in configuration to the segments 66a and 66b and accordingly corresponding elements thereof have been provided with the same reference numerals, to which the subscript "c" has been added as the corresponding elements of the segments 66. Each pair of complementary segments 266a and 266b is connected by a pivot connector link 270 whose arcuate pivot end portions 271 connected by the intermediate portion 273 thereof are receivable in the sockets 274 and 275 of adjacent complementary segments 266a and 266b, respectively. It will be apparent that segments 266a and 266b are pivotally connected to adjacent segments for pivotal movement about longitudinally and circumferentially spaced axes in the same manner as the segments 66a and 66b. The axes of pivotal movement of the segments 266 extend perpendicular to but do not intersect the central axis of the seal. Each such axis of pivotal movement extends parallel to a radial line of the seal. This orientation of the axis of pivotal movement of the pivotally connected adjacent links 66 and 266 relative to one another assures that the segments do not tilt about an axis which extends angularly relative to the radial lines in such manner as to move one of them away from the inner wall of the flow conductor as the seal expands and contracts which would occur if such axis of pivotal movement of the segment were a radial axis which intersected the central longitudinal axis of the seal.

The well tool 300 illustrated in FIGURES 19 through 23 includes a body 301 having an upper section 302 provided at its upper end with a threaded pin 303 by means of which the body may be connected to any other suitable well tool and a lower section 304 threaded on the lower end of the top section. The upper and lower body sections define an external annular groove 305 in which is disposed an annular seal 306 whose longitudinal movement on the body is limited by the top annular upwardly and outwardly extending or beveled seal shoulder or seal surface 309 provided by the external annular flange 310 of the top section and the top downwardly and outwardly inclined annular shoulder or seal surface 311 of the bottom body section. An intermediate deeper portion of the recess is defined by the upper and lower annular shoulders 314 and 315 of the upper body section. A longitudinal outwardly opening slot 316 of the top body section opens into the recess 305 and a flow passage 318 of the upper body section opens to the lower end of the slot 316 and into a chamber 319 between the lower end of the upper body section and the pin 320 of a suitable connector sub 321. A valve 322 is movably mounted in the flow chamber and its seal surface 324 is sealingly engageable with the annular seat or seal surface 325 of the upper body section extending about the flow passage.

The valve 322 is biased upwardly toward closed position by a biasing spring 327 whose strength and force predetermines the pressure at which the valve will open to permit downward flow of fluids through the flow passage 318 into the chamber 319 and thence to the exterior of the body through the lateral ports 328 of the lower body section.

The seal 306 includes a resilient tubular body 330 in which are embedded, and bonded to, the inner portions of a plurality of segments 331a and 331b of a wear resistant rigid substance such as metal or the like. The identical segments 331a have configurations which are mirror images of the identical segments 331b. The segments of the seal are positioned in annular array or alignment with each segment 331a disposed between and pivotally connected to a pair of the segments 331b and with each segment 331b disposed between and pivotally connected to a pair of segments 331a. Each segment 331a has a pair of longitudinally spaced hooks or pins 332a and 332b which extend divergently in the same longitudinal direction, as downwardly, at opposite sides of the segment and which define with the segments the downwardly opening sockets 333a and 333b. Each of the segments 331b similarly has a pair of hooks or pins 334a and 334b which extend divergently in one longitudinal direction, as upwardly, at opposite sides of the segment and which define the upwardly opening sockets 335a and 335b. Each segment 331a has its lower hook 332a extending downwardly into the upwardly opening socket 335a of one segment 331b. The bottom end surface of such hook 332a engages the upwardly facing surface of the segment 331b defining the lower end of the socket 335a to prevent longitudinal movement of the segments relative to one another. The hook 334a of such segment 331b extends into the socket 333a of the segment 331a but the top surface of its hook 334a is spaced from the downwardly facing surface of the socket 333a whereby pivotal movement of the two segments may take place about an axis which extends parallel to but spaced from a radial line passing through the central longitudinal axis of the seal.

The upper hook 332b of each segment 331a, similarly extends into the socket 335b of the segment 331b disposed at its opposite side whose top hook 334b extends into its socket 333b. The top surface of the hook 334b engages the top surface of the socket 333b to prevent longitudinal movement of the segment relative to one another. Since the segments are embedded in the resilient body 330 they are held against disengagement and the pivotal connection of their hooks permits radial contraction and expansion of the seal.

Each segment 331a has a pair of internal arcuate recesses 336a and 336b which open laterally outwardly at one side thereof and which extend in opposite longitudinal directions at opposite ends of its hook 332a and socket 333a and with a pair of internal annular recesses 337a and 337b which open laterally outwardly in the opposite direction at its other side and which extend longitudinally in opposite direction at opposite ends of its other hook 332b and socket 333b. Each of the segments 331b similarly has internal recesses 338a and 338b which open laterally outwardly at one side thereof and extend longitudinally in opposite direction from opposite ends of its upper hook 334b and its socket 335b and with internal arcuate recesses 339a and 339b which open laterally outwardly at its other side and which extend longitudinally in opposite directions from locations spaced above and below, respectively, its lower hook 334a and its socket 335a. It will be apparent that these recesses of the segments 331a and 331b serve the same function as the similar internal recesses of the segments of the seal 50 to receive the outer portions of the resilient body which extend partly into such recesses and are displaced outwardly during movement of longitudinal portions of the segments toward and away from one another during contraction and expansion. For example, during movement of the sides of the segments provided with the recesses 337a and 338a toward one another, outer portions of the tubular resilient body disposed therebetween are compressed between the surfaces defining the internal recesses and are displaced outwardly into the space provided by the recesses while at the same time the portions of the tubular body extending into the recesses 337b and 338b are stretched.

The bosses 340 of the segments extend radially outwardly of the external recess 305 of the body 301 to engage the internal surfaces of a flow conductor through which the tool is movable. Each segment has opposite end stop portions 341 and 342 extending outwardly of the beveled shoulders 343 and 344, respectively, which extend in opposite longitudinal directions from the vertical arcuate outer seal surfaces 345 of the bosses. The end stop portions at opposite ends of the segments telescope into upper and lower retainer rings 346 and 347, respectively. The retainer rings telescope over the opposite annular upper and lower end portions 348 and 349 of the resilient body which extend longitudinally outwardly in opposite directions from the segments. The upper end portion of the resilient seal body is provided with an external annular flanges 350 which is received in an internal annular recess 351 of the top retainer ring and with an internal annular recess 353 in which is disposed a split resilient retainer ring 355 which exerts an outward force on the resilient body and holds the body against inward movement and thus its flange 350 from displacement from its recess 351 of the top retainer ring. The lower end portion 349 of the resilient body similarly has an external annular flange 358 which is received in an internal annular recess 359 of the bottom retainer ring and with an internal annular recess 360 in which is received a split resilient retainer ring 362 which yieldably holds the bottom end portion of the seal body against inward displacement and out of engagement with the lower retainer ring. The inner annular top lip 363 at the top end of the resilient body is sealingly engageable with the top seal surface 309 of the body 301 when the seal is moved upwardly on the body. The bottom lip 364 of the resilient body is sealingly engageable with the seal surface 311 of the body to seal therebetween when the seal is in a lower position on the body illustrated.

It will now be seen that when the seal 306 is in a lower position on the body and the pressure in the flow conductor exteriorly of the body 301 and above the seal 306 is greater than the pressure exteriorly of the body below the seal, the fluid pressure from above the seal communicated to the upper end of the annular chamber 372 between the body and the seal expands and biases the resilient body 330, and therefore the segments 331a and 331b outwardly to close the annulus between such conductor and the ring segments and at the same time such pressure differential biases the seal downwardly on the body and holds the bottom lip 364 in sealing engagement with the seal surface 311. The annular chamber is then open at its top end and closed at its bottom end. Such pressure differential therefore causes the well tool 300 to be moved downwardly in such flow conductor until its downward movement is stopped by an internal obstruction of the flow conductor.

Downward movement of the seal on the body is limited by the engagement of the annular bottom shoulder 366 of the bottom retainer ring with the seal surface 311 outwardly of the location of the sealing engagement of the bottom lip with this seal surface. The bottom lip, of course, is compressed and deflected upwardly as the lower limit of downward movement of the seal on the body is reached. The engagement of the downwardly facing shoulders 367 of the segments with the top annular end shoulder or surface 368 of the bottom retainer ring limits their downward movement relative to the bottom retainer ring.

Similarly, upward movement of the seal on the body is limited by the engagement of the top annular shoulder 369 of the top retainer ring with the seal surface 309 and upward movement of the segments relative to the top retainer ring is limited by the engagement of their upwardly facing shoulder 367 with the bottom annular end shoulder or surface 370 of the top retainer ring. The shoulders 367 and 371 of each segment define the ends of its boss 340. The shoulders 371 of the segments are spaced inwardly of the shoulders 367 of adjacent segments and are spaced from the adjacent shoulders 368 and 370 of the retainer rings to permit pivotal movement of the segments relative to one another which causes the shoulders 371 to move toward either the adjacent retainer ring shoulder 368 or 370.

In use, when it is desired to move any tool 321, such as a valve or the like through a well flow conductor by means of a fluid pumped into one end of the flow conductor, such tool is connected to the lower end of the body 301 by means of the connector sub 321 whose pin 320 is threaded into the bottom body section 304. If desired, another tool identical to the tool 300 may be connected to the upper end of the body 301, preferably by a swivel connection, with the two tools such tools 300 longitudinally spaced to span any internal recesses of the flow conductor, such as the usual coupling or collar recesses thereof.

The seal of the well tool 300 due to the resilient force of the annular resilient body, prior to the insertion of the tool into the flow conductor, assumes a fully expanded position wherein its outward movement thereof is limited by the engagement of the stop end portions 341 and 342 of its segments with the internal surfaces of its top and bottom retainer rings so that the bosses of the segments extend outwardly of the retainer rings and of the body. When the well tool 300 is inserted into such flow conductor, its seal is cammed radially inwardly into the recess 305 towards the partly contracted position illustrated in FIGURE 19, the camming engagement of the downwardly facing beveled shoulders 343 and 344 of the segments 331b and 331a facilitating such insertion of the well tool into the flow passage and the movement of the seal past any internal obstructions of the flow conductor. As the seal is thus moved to partly contracted or retracted position, the outer portions of the resilient body which extend radially outwardly into the internal recesses of the segments may deform outwardly into such recesses thus preventing undue compression and damage to the resilient seal body.

When the seal 306 is in its normal operative position in a well flow conductor, illustrated in FIGURE 19, the arcuate surfaces 345 of the bosses 340 of the segments constitute sections of and lie in a cylindrical plane whose diameter is substantially equal to the normal internal diameter of the flow conductor and such surfaces sealingly engage the internal surfaces of the flow conductor along a substantial continuous seal line S which extend circumferentially across the outer surfaces 345. The only gaps in this line may occur between the surfaces of the segments at the sockets and the adjacent and contacting outer surfaces of the hooks disposed therein. Any such gaps will be of extremely small orifice so that the seal effectively closes the annulus between the flow conductor and the body 301 on which it is mounted and any small leakage of fluid which passes such seal through such gaps does not decrease to any appreciable degree the efficiency of the well tool. As the pressure in the flow passage of the flow conductor above the well tool 20 is increased due to the pumping of fluids into the flow conductor to a value which exceeds the pressure in the flow conductor below the well tool, its seal is moved downwardly on the body until the bottom seal lip 364 engages the seal surface 311 and thus closes the bottom end of the annular chamber 365. Downward movement of the seal is then limited by the engagement of the shoulder 366 of the bottom retainer ring with the seal surface 311. Such fluid pressure acting on the internal surfaces of the resilient seal body biases the segments outwardly into sealing engagement with the internal surfaces of the flow conductor and at the same time biases the seal downwardly on the body and the bottom seal lip into sealing engagement with the seal surface 311 to close the lower end of the chamber 372 and prevent flow of fluids therefrom to the exterior of the well tool below the seal. The seal thus closes the annulus between the flow conductor and the body on which the seal is mounted and the downwardly acting force of the pressure differential across the tool, as fluid is pumped into the flow conductor, moves the well tool and any other tool connected thereto downwardly through the flow conductor.

It will be apparent that the greater the pressure differential across the seal, the greater the force with which the bottom lip is held in sealing engagement with the seal surface 311 and the greater the force at which the segments are biased outwardly and held in sealing engagement with the internal surfaces of the well flow conductor thus assuring proper closure of the annulus between the well tool body and the well flow conductor up to the value of the pressure differential at which the valve 322 will move to its open position.

If the well tool becomes lodged in a well flow conductor, an increase in the pressure differential thereacross will cause the valve 322 to be moved to its open position thus preventing damage to the tool due to the creation of an excessive pressure differential thereacross.

If it should now be desired to remove the tool from such flow conductor, as by increasing the pressure in the flow conductor below the tool, the pressure differential will cause the seal to move upwardly on the body until its top seal lip 363 engages the seal surface 309 and thus closes the upper end of the annular chamber 372. Such pressure differential will now hold the seal in its upper position on the body, with the chamber 372 closed at its upper end, except for the restricted orifice provided by the longitudinal slot 316, and open at its lower end, and at the same time tend to expand the resilient body and the segments radially outwardly and thus cause the annulus between the body 301 and the flow conductor to be closed whereby the tool may be moved upwardly in the flow conductor by such pressure differential.

It will now be apparent that the well tool 300 functions in the same manner as the well tools 20 and 200 to close the flow passage of a flow conductor through which it is movable by a fluid pressure differential existing thereacross and that the tool is movable in either longitudinal direction through the flow conductor, the seal moving on the well tool body 301 to close either the bottom or top end of the chamber 372 as determined by the direction of the force exerted thereon by the pressure differential existing thereacross.

It will now be apparent that the rigid segment of the various forms of the seal may be pivotally connected to one another by any one of the pin or hook and socket means illustrated and described. For example, the segments of the seal 50 may be provided with the hook and socket connections of the segments of the seal 306 and vice versa.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A well tool movable through the flow passage of a flow conductor including: a body having an annular external recess and an annular seal surface adjacent one end of said recess; and an annular seal in said recess, said seal comprising an annular resilient body disposed in said recess and having a plurality of longitudinally extending circumferentially aligned rigid segments secured to one another for pivotal movement relative to one another to permit radial contraction and expansion of said seal, said segments having boss means extendable outwardly of said recess to engage internal surfaces of a flow conductor in which said well tool is disposable to seal between said body and the internal surface, said resilient body having an annular seal portion engageable with said seal surface of said body for sealing therebetween.

2. The well tool of claim 1 wherein said seal and said body have coengageable means limiting outward movement of said segments relative to said body.

3. The well tool of claim 2 wherein said resilient body and said body provide an annular chamber having one end closable from the exterior of said well tool at one end of said seal by the engagement of said annular seal portion with said seal surface and having its outer end communicable with the exterior of said well tool at the other end of said seal.

4. The well tool of claim 1 wherein said segments have longitudinally spaced connecting means connecting each segment to adjacent segments and providing for pivotal movement of said adjacent segments about longitudinally and circumferentially spaced axes extending substantially radially relative to the central longitudinal axis of said seal.

5. The well tool of claim 3 wherein said segments have longitudinal spaced connecting means connecting each segment to adjacent segments and providing for pivotal movement of said adjacent segments about longitudinally and circumferentially spaced axes extending substantially radially relative to the central longitudinal axis of said seal.

6. The well tool of claim 1 wherein each pair of adjacent segments has longitudinally aligned socket means and a connector link having end pivot means disposed in said socket means.

7. A well tool including: a body having an annular external recess and spaced grooves at opposite ends of said recess opening to said recess at opposite longitudinal ends thereof, said body having annular internal seal surfaces defining outer sides of said grooves; an annular seal in said external recess of said body, said seal comprising an annular resilient body having opposite annular end lip portions extending into said grooves and engageable with said seal surfaces, said seal including a plurality of longitudinally extending circumferentially aligned rigid segments bonded to said resilient body and having bosses extending outwardly of said resilient body through said recess for engaging internal surfaces of a well flow conductor, said segments being pivotally connected to one another to permit expansion and contraction of said seal relative to said body.

8. The well tool of claim 7 wherein said seal and said body have coengageable stop means limiting longitudinal movement of said seal relative to said body.

9. The well tool of claim 8, wherein said body and said seal provide an annular chamber therebetween, said lip portions being movable out of engagement with associated seal surfaces to permit pressure from exteriorly of said body at one longitudinal end of said seal to be communicated to said chamber and hold the other of said lip portions in sealing engagement with its associated seal surface when said seal is in extreme opposite longitudinal positions on said body.

10. The well tool of claim 1 wherein said body has passage means extending past said seal and opening to the exterior of the body, and closure means closing said passage means and openable when the pressure differential across said pressure means exceeds a predetermined limit.

11. An annular seal including: an annular resilient body; a ring of rigid segments disposed about and secured to said body, said segments having means at opposite longitudinal sides thereof pivotally connecting adjacent segments to each other to permit radial contraction and expansion of said seal, said segments having outer intermediate arcuate seal surfaces and inwardly and longitudinally outwardly extending cam surfaces on opposite ends of said seal surfaces, said segments having end stop portions at opposite ends thereof spaced inwardly of said cam surfaces.

12. An annular seal including: an annular resilient body; a ring of rigid segments disposed about and secured to said body, said segments having means at opposite longitudinal sides thereof pivotally connecting adjacent segments to each other to permit radial contraction and expansion of said seal, said segments having outer intermediate arcuate seal surfaces and inwardly and longitudinally outwardly extending cam surfaces on opposite ends of said seal surfaces.

13. The annular seal of claim 12, wherein said resilient body has an annular end lip extending longitudinally outwardly of said segments.

14. The annular seal of claim 12, wherein said resilient body has annular end lips at opposite ends thereof disposed inwardly of said segments and extending longitudinally outwardly of said segments.

15. The annular seal of claim 12 wherein said resilient body has annular end lips at opposite ends thereof which extend longitudinally outwardly of said segments, said resilient lips having external annular recesses providing area of decreased radial thickness of said lips.

16. An annular seal including: an annular resilient body; a ring of rigid segments disposed about said body having inner portions thereof embedded in and bonded to said body; means connecting each of said segments to adjacent segments at opposite longitudinal sides thereof at longitudinally spaced locations for pivotal movement relative to said adjacent segments about longitudinally and circumferentially spaced axes to permit radial contraction and expansion of said seal.

17. An annular seal including: an annular resilient body; a ring of rigid segments disposed about said body having inner portions thereof embedded in and bonded to said body; means connecting each of said segments to adjacent segments at opposite longitudinal sides thereof at longitudinally spaced locations for pivotal movement relative to said adjacent segments about longitudinally and circumferentially spaced axes to permit radial contraction and expansion of said seal, said segments having outwardly extending bosses providing arcuate outer seal surfaces, said resilient body having outer portions extending outwardly between adjacent sides of adjacent bosses to a plane spaced inwardly of said seal surfaces and filling interstices therebetween.

18. An annular seal including: an annular resilient body; a ring of rigid segments disposed about said body having inner portions thereof embedded in and bonded to said body, each of said segments being connected to adjacent segments at opposite longitudinal sides thereof for pivotal movement relative to said adjacent segments about longitudinally and circumferentially spaced axes to permit radial contraction and expansion of said seal, said segments having outwardly extending bosses providing arcuate outer seal surfaces, said resilient body having outer portions extending outwardly between adjacent sides of adjacent bosses to a plane spaced inwardly of said seal surfaces and filling interstices therebetween, each pair of adjacent segments having facing longitudinal sides and internal recesses opening laterally outwardly of said sides and toward each other, said outer portions of said resilient body extending into said recesses.

19. An annular seal including: an annular resilient body; a ring of rigid segments disposed about said body having inner portions thereof embedded in and bonded to said body, each of said segments being connected to adjacent segments at opposite longitudinal sides thereof for pivotal movement relative to said adjacent segments about longitudinally and circumferentially spaced axes to permit radial contraction and expansion of said seal, each of said segments having hook and socket means on opposite sides thereof, said hook and socket means of adjacent segments pivotally connecting said segments to one another.

20. An annular seal including: an annular resilient body; a ring of rigid segments disposed about said body having inner portions thereof embedded in and bonded to said body, each of said segments being connected to adjacent segments at opposite longitudinal sides thereof for pivotal movement relative to said adjacent segments about longitudinally and circumferentially spaced axes to permit radial contraction and expansion of said seal, said segments having outwardly extending bosses providing arcuate outer seal surfaces, said resilient body having outer portions extending outwardly between adjacent sides of adjacent bosses to a plane spaced inwardly of said seal surfaces and filling interstices therebetween.

21. An annular seal including: an annular resilient body; a ring of rigid segments disposed about said body having inner portions thereof embedded in and bonded to said body, each of said segments being pivotally connected to adjacent segments at opposite longitudinal sides thereof by pin and socket means thereof for pivotal movement relative to said adjacent segments about longitudinally and circumferentially spaced axes to permit radial contraction and expansion of said seal; and resilient plug means extending radially outwardly of said annular body and between facing surfaces of each pair of segments at said pin and socket means thereof and sealing therebetween.

22. A device movable in a longitudinal passage, said device including: a body having an annular external recess and an annular seal surface adjacent one end of said recess; and an annular seal in said recess, said seal comprising an annular resilient body disposed in said recess and having a plurality of longitudinally extending circumferentially aligned rigid segments secured to one another for pivotal movement to permit radial contraction and expansion of said seal, said segments having boss means extendable outwardly of said recess for sealing engagement with surfaces defining flow passage in which said device is movable, said resilient body having at one end thereof an annular seal portion engageable with said seal surface of said body for sealing therebetween.

23. A device movable in a longitudinal passage, said device including: a body having an annular external recess and an annular seal surface adjacent one end of said recess; and an annular seal in said recess, said seal comprising an annular resilient body disposed in said recess and having a plurality of longitudinally extending circumferentially aligned rigid segments secured to one another for pivotal movement to permit radial contraction and expansion of said seal, said segments having boss means extendable outwardly of said recess for sealing engagement with surfaces defining a flow passage in which said device is movable, said resilient body having at one end thereof an annular seal portion engageable with said seal surface of said body for sealing therebetween, said seal and said body having coengageable means limiting outward movement of said segments relative to said body.

24. The device of claim 23 wherein said resilient body and said body provide an annular chamber having one end closable from the exterior of said well tool at one end of said seal by the engagement of said annular seal portion with said seal surface and having its other end communicable with the exterior of said well tool at the other end of said seal.

25. A well tool movable through the flow passage of a flow conductor including: a body having an annular external recess and an annular seal surface adjacent one end of said recess; and an annular seal in said recess, said seal comprising an annular resilient body disposed in said recess and a plurality of longitudinally extending circumferentially aligned rigid segments; and means securing each segment to adjacent segments at opposite sides thereof for pivotal movement relative to said adjacent segment about longitudinally and circumferentially spaced axes, each of said axes extending perpendicular to the central longitudinal axis of said resilient body and spaced therefrom.

26. A well tool including: a body having an annular external recess and an annular seal surface at one end of said recess; and an annular seal disposed on said body in said recess for limited longitudinal movement relative to said body, said seal comprising an annular resilient body having an annular lip at one end thereof sealingly engageable with said seal surface when said seal is in one extreme longitudinal position on said body, said seal having a plurality of longitudinally extending circumferentially aligned rigid segments secured to one another for pivotal movement relative to one another to provide for radial contraction and expansion of said seal, said seal and said body defining an annular chamber open to the exterior of the seal at a location remote from said annular lip, engagement of said annular lip with said seal surface closing said one end of said chamber when said seal is in said one extreme position.

27. A well tool including: a body having an annular external recess and annular seal surfaces at opposite longitudinally spaced ends of said recess; and an annular seal mounted on said body and disposed in said recess for limited longitudinal movement relative to said body between an upper position and a lower position on said body, said seal having an upper annular lip at its upper end for engaging said upper seal surface when said seal is in said upper position and a lower annular lip at its lower end for sealingly engaging said lower seal surface when said seal is in said lower position, said seal and said body defining an annular chamber therebetween open to the exterior of the body, said chamber being open at its upper end when said seal is in said lower position and its lower lip engages said lower seal surface to close the lower end of said body, said chamber being open at its lower end to the exterior of the seal when said seal is in said upper position on said body and said upper lip sealingly engages said upper seal surface to close the upper end of said chamber.

28. A well tool including: a body having an annular external recess and annular seal surfaces at opposite longitudinally spaced ends of said recess; and an annular seal mounted on said body and disposed in said recess for limited longitudinal movement relative to said body between an upper position and a lower position on said body, said seal having an upper annular lip at its upper end for engaging said upper seal surface when said seal is in said upper position and a lower annular lip at its lower end for sealingly engaging said lower seal surface when said seal is in said lower position, said seal and said body defining an annular chamber therebetween open to the exterior of the body, said chamber being open at its upper end when said seal is in said lower position, and its lower lip engages said lower seal surface to close the lower end of said body, said chamber being open at its lower end to the exterior of the seal when said seal is in said upper position on said body and said upper lip sealingly engages said upper seal surface to close the upper end of said chamber, said body having a passage communicating with said chamber and the exterior of said body to permit fluid flow past one of said seal surfaces from said chamber; and pressure responsive valve means closing said passage and opening wherein the pressure differential thereacross exceed a predetermined value.

29. A seal including: a resilient tubular body; a plurality of longitudinally extending rigid segments disposed about and secured to said body, each of said segments being pivotally connected to adjacent segments at opposite sides thereof for pivotal movement relative thereto about axes spaced longitudinally of said body and extending perpendicularly relative to the central longitudinal axis of said body, said segments having outer surfaces adapted to lie in a substantially circular plane and sealingly engage internal surfaces of a flow conductor in which the seal is movable.

30. A seal including: a resilient tubular body; a plurality of longitudinally extending rigid segments disposed about and secured to said body, each of said segments being pivotally connected to adjacent segments at opposite sides thereof for pivotal movement relative thereto about axes spaced longitudinally of said body and extending perpendicularly relative to the central longitudinal axis of said body, said segments having outer surfaces adapted to lie in a substantially circular plane and sealingly engage internal surfaces of a flow conductor in which the seal is movable; and means disposed about opposite end portions of said segments limiting radial expansion of said body.

31. A seal including: a resilient tubular body; a plurality of longitudinally extending rigid segments disposed about and secured to said body, each of said segments being pivotally connected to adjacent segments at opposite sides thereof for pivotal movement relative thereto about axes spaced longitudinally of said body and extending perpendicularly relative to the central longitudinal axis of said body, said segments having outer surfaces adapted to lie in a substantially circular plane and sealingly engage internal surfaces of a flow conductor in which the seal is movable; and means disposed about opposite end portions of said segments limiting radial expansion of said body, said body having annular seal lips at opposite ends thereof.

32. A seal including: a resilient tubular body; a plurality of longitudinally extending rigid segments disposed about and secured to said body, each of said segments having hook and socket means at opposite sides thereof and spaced longitudinally from each other, said hook and socket means of each segments extending longitudinally in the same direction and said hook and socket means of adjacent segments extending in longitudinally opposite directions and engaging one another to secure said segments against longitudinal movement relative to one another and permit pivotal movement of each segment relative to adjacent segments at opposite sides thereof about longitudinally spaced axes extending perpendicularly to the central longitudinal axis of said body.

33. The seal of claim 31, wherein said means limiting radial expansion of said body comprises a pair of rigid annular retainers each having an internal annular recess, opposite end portions of said body extending into said retainers and having external flanges disposed in said internal recesses of said retainers.

34. The seal of claim 33, wherein said end portions of said body are provided with internal annular recesses, and retainer means in said recesses of said body holding said flanges of said body against inward displacement from said recesses of said retainers.

References Cited by the Examiner

UNITED STATES PATENTS

| | | | |
|---|---|---|---|
| 2,287,205 | 6/1942 | Stone | 277—28 |
| 2,330,267 | 9/1943 | Burt et al. | 137—71 |
| 2,664,952 | 1/1954 | Losey | 277—181 |
| 2,780,294 | 2/1957 | Loomis | 277—154 |
| 2,828,823 | 4/1958 | Mounce | 277—34.6 |
| 2,888,079 | 5/1959 | Cypher | 166—139 |
| 3,038,542 | 6/1962 | Loomis | 166—187 XR |
| 3,053,322 | 9/1962 | Kline | 277—34.6 |
| 3,229,768 | 1/1966 | Lunebring | 166—170 |
| 3,231,289 | 1/1966 | Carrell | 277—333 XR |

FOREIGN PATENTS 324,406   1/1930   Great Britain.

SAMUEL ROTHBERG, *Primary Examiner.*